May 1, 1928.
R. R. KENWORTHY
LOCKING DEVICE
Filed April 5, 1927
1,668,321
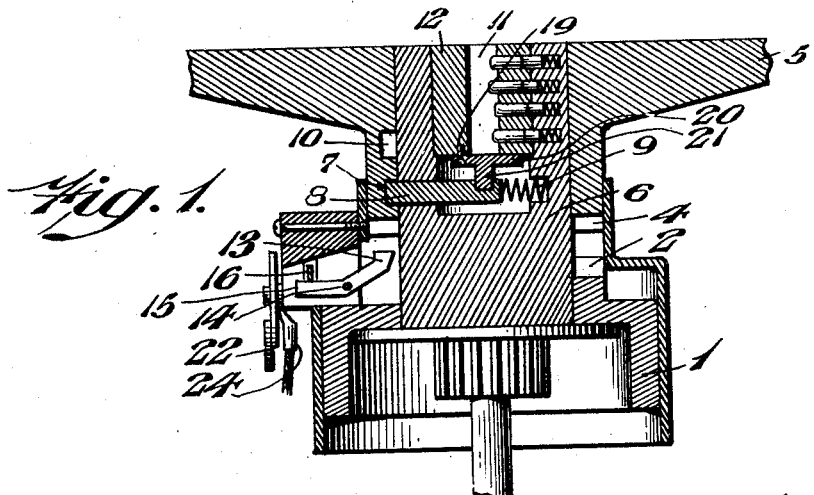
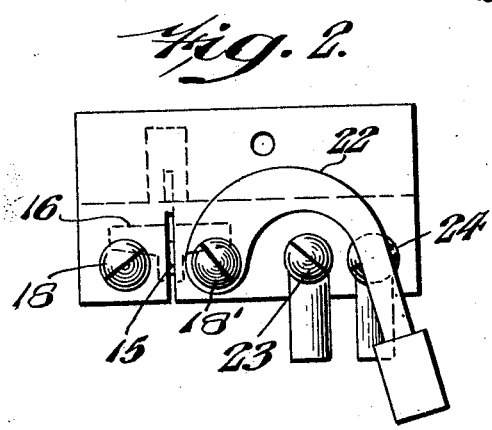
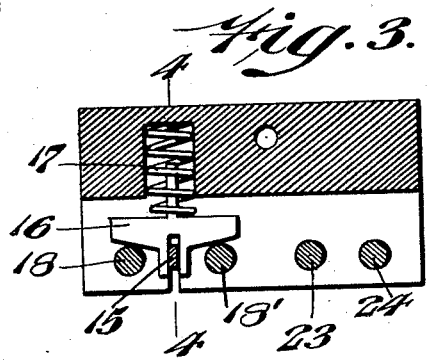
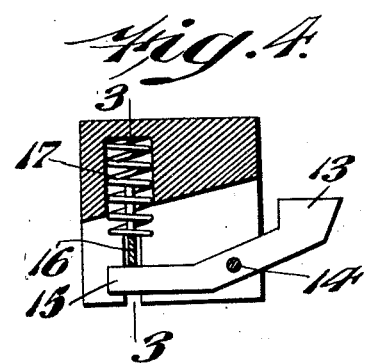
INVENTOR:
ROBERT R. KENWORTHY,
BY
ATTORNEYS.

Patented May 1, 1928.

1,668,321

UNITED STATES PATENT OFFICE.

ROBERT R. KENWORTHY, OF PHILADELPHIA, PENNSYLVANIA, ASSIGNOR OF ONE-FOURTH TO JOHN F. DALY, ONE-FOURTH TO WILLIAM DONAHUE, AND ONE-FOURTH TO BYRON R. KENWORTHY, ALL OF PHILADELPHIA, PENNSYLVANIA.

LOCKING DEVICE.

Application filed April 5, 1927. Serial No. 181,032.

This invention has relation to and provides a novel structure from copending application Serial No. 179,207; filed March 29, 1927, in the name of Byron R. Kenworthy and Robert R. Kenworthy.

This invention relates to electrical mechanism for a locking device for various purposes although it has especial relation to locking mechanism for motor cars, particularly as mounted in relation to the steering wheel post.

The leading object of the present invention may be said to reside in the provision of mechanism or a device of the character stated which is of simple construction, comparatively inexpensive to manufacture, and which may be readily applied to existing lock structures, for example, automobile steering wheel post locks, by reason of which steering of the automobile is prevented when the mechanism is properly set by the driver, and the motor is automatically stopped.

A further object of the present invention is to provide mechanism or a device of the character stated in which electrical contact is made between a moving part and some source of electrical energy, as for instance between the steering wheel of an automobile and the magneto, battery, or generator of the automobile, or in other words, the ignition system of an automobile.

A still further object of the present invention is to provide an automobile steering wheel lock in which a key is insertible into the locking device to operate or permit the operation of some other part of the mechanism which in turn makes contact with certain electrical connections for making and breaking of electrical connection with the automobile ignition circuit, which key, however, may be removed irrespective of the cooperative positions of the locking attachment.

Other and further objects of the present invention reside in the provision of general details of construction and in the arrangement and combination of parts as will hereinafter appear.

The invention consists of the novel construction hereinafter described and finally claimed.

The nature, characteristic features and scope of the invention will be more fully understood from the following description taken in connection with the accompanying drawings forming part hereof, in which:

Fig. 1, is a fragmentary view in central section of the steering wheel mechanism of an automobile illustrating one embodiment of the present invention, the drawing illustrating the parts in unlocked position.

Fig. 2, is a fragmentary detached view in elevation of certain of the parts shown in Fig. 1.

Fig. 3, is a view in cross section taken upon the line 3—3 of Fig. 4.

Fig. 4, is a view in section taken upon the line 4—4 of Fig. 3.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, and with more especial relation to Figs. 1 to 4 inclusive, the reference numeral 1 designates the base of the device. This base is provided at its top with a number of upwardly projected, serrated portions or lugs 2 adapted to cooperate with which are lugs 4, carried by the steering wheel 5. Obviously, in lieu of the steering wheel, which is shown for explanatory purposes, some other element may be locked with respect to the base 1; and obviously the base 1 may be of any desired form of construction other than as fitted to an automobile steering post. Positioned within the base 1 is the hub 6 carrying certain parts of the mechanism to be detachably secured with respect to the steering wheel 5. Mounted within the hub 6 is a horizontally disposed bolt 8, which bolt, as shown in Fig. 1, cooperatively engages the recessed portion 7, of wheel 5, said bolt being spring pressed as at 9. In the position shown in Fig. 1, the steering wheel 5 is in elevated, or steering position. The steering wheel 5 is also provided with a notched part 10 so that when a key is inserted within opening 11 of wheel 5 and turned to operate the conventional barrel 12, the bolt 8 is withdrawn from aperture 7 so that the wheel 5 may be depressed. By the depression of the wheel the aperture 10 comes in alignment with the bolt 8 so that the wheel 5 is locked with respect to the base 1. During this movement of parts, contact has been made with the lever 13 pivoted as at 14 in view of which contact the free end 15 of lever 13 is elevated, thus moving upwardly contact 16 against the action of spring 17 and breaking contact with terminals 18—18'. With the breaking of electrical connection with the terminals 18—18' the ignition circuit, not shown in the drawings, is broken so that the motor is stopped simultaneously with the locking of the mechanism for rendering the steering apparatus inoperative. In this connection it is to be noted that the key, not shown, can be readily removed from the barrel 12 in the steering wheel 5 whether the motor is running or whether the motor is stopped, the advantages of which are apparent.

As clearly shown in Fig. 1, the barrel 12 has fixed thereto as by a pin or screw 19 a cam 20, which cam is provided with a pin 21 cooperatively fitted with respect to bolt 8. Thus, as the key is inserted in the barrel and turned, the bolt is caused to move horizontally with respect to the hub 6.

As shown in Figs. 2 and 3, the terminal 18 is adapted to be connected to the motor side of the ignition circuit, and the terminal 18' carries on it the switch arm 22 permitting operation of the motor on either the battery or magneto circuit but being so designed as not to permit the motor to be shut off by the function of the arm 22. Reference numeral 23 designates a terminal adapted to be electrically connected to a battery, not shown, and 24 designates a terminal adapted to be electrically connected with the magneto or generator, not shown. When the arm 22 is in the position shown in Fig. 2, that is, resting upon the terminal 24, the energy supplied by the magneto or generator is transferred through the circuit formed by the terminal 24, switch arm 22, terminal 18', from which it is bridged by contact 16 to terminal 18, and thence to the motor side of the ignition circuit.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent is:

1. In a device of the character stated, a stationary member having clutch teeth, a second member comprising a hub rotatable with respect thereto and having clutch teeth for removable engagement with respect to the first mentioned teeth, a key receiving element, including a conventional barrel, carried by the rotatable member, an electrical connection operatively arranged for cooperation with an ignition circuit, a cam carried by said rotatable member, a bolt operable by said cam for disengaging said wheel and hub to permit depression of said hub, said barrel being operable upon key insertion and key turning for closing said circuit.

2. In a device of the character stated, a stationary member having clutch teeth, a second member comprising a hub rotatable with respect thereto and having clutch teeth for removable engagement with respect to the first mentioned teeth, a key receiving element, including a conventional barrel, carried by the rotatable member, an electrical connection including a pivotal detent and a bridging contact operatively arranged for coperation with an ignition circuit, a cam carried by said rotatable member, a bolt operable by said cam for disengaging said wheel and hub to permit depression of said hub, said barrel being operable upon key insertion and key turning for closing said circuit.

ROBERT R. KENWORTHY.